(12) United States Patent  
Claerhout et al.

(10) Patent No.: US 7,497,775 B1
(45) Date of Patent: Mar. 3, 2009

(54) REAR ACCESSIBLE SIEVE RETAINER

(75) Inventors: Bryan S. Claerhout, Colona, IL (US); Robert A. Matousek, Milan, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/895,982

(22) Filed: Aug. 28, 2007

(51) Int. Cl.
*A01F 12/32* (2006.01)
*B07B 1/00* (2006.01)

(52) U.S. Cl. ...................................... 460/101
(58) Field of Classification Search ................ 460/101, 460/102, 109; 209/394, 408, 404, 325, 346, 209/365.4
See application file for complete search history.

(56) References Cited

U.S. PATENT DOCUMENTS

| | | | |
|---|---|---|---|
| 864,491 A | 8/1907 | Snyder | |
| 1,177,812 A | 4/1916 | Rumely et al. | |
| 1,820,055 A | 8/1931 | Divorky | |
| 2,413,382 A * | 12/1946 | Sargent et al. | 209/394 |
| 3,470,881 A * | 10/1969 | De Pauw et al. | 460/109 |
| 3,913,589 A | 10/1975 | Rouse et al. | 130/24 |
| 4,502,493 A | 3/1985 | Jones et al. | 130/24 |
| 4,531,528 A * | 7/1985 | Peters et al. | 460/97 |
| 4,770,190 A * | 9/1988 | Barnett | 460/102 |
| 4,897,071 A | 1/1990 | Desnijder et al. | 460/10 |
| 5,525,108 A | 6/1996 | Rouse et al. | 460/101 |
| 6,632,136 B2 | 10/2003 | Anderson et al. | 460/101 |
| 6,672,957 B2 * | 1/2004 | Voss et al. | 460/101 |
| 7,011,579 B2 | 3/2006 | Gorden | 460/101 |
| 7,029,392 B2 | 4/2006 | Jonckheere et al. | 460/62 |
| 2002/0183103 A1 * | 12/2002 | Anderson et al. | 460/101 |
| 2003/0186731 A1 * | 10/2003 | Voss et al. | 460/101 |
| 2007/0037620 A1 | 2/2007 | Anderson et al. | 460/111 |

FOREIGN PATENT DOCUMENTS

| | | |
|---|---|---|
| JP | 6153674 | 6/1994 |
| RU | 816425 | 3/1981 |
| RU | 1443852 | 12/1988 |

* cited by examiner

*Primary Examiner*—Árpád Fábián-Kovács
(74) *Attorney, Agent, or Firm*—Michael G. Harms; John William Stader; Patrick M. Sheldrake

(57) ABSTRACT

A sieve retainer for an agricultural combine which is more accessible, particularly from the rear of the combine, which provides improved access to, and removal and replacement of the sieve and prevents loss of sieve retaining hardware.

18 Claims, 10 Drawing Sheets

REAR ACCESSIBLE SIEVE RETAINER

TECHNICAL FIELD

This invention relates generally to a retainer for a grain cleaning sieve or sieves of a cleaning system of an agricultural combine, and more particularly, to a retainer which is more accessible, particularly from the rear of the combine, and which provides improved access to, and removal and replacement of the sieve.

BACKGROUND ART

It is well known to provide a sieve or sieves in the grain cleaning system of an agricultural combine. Typically, the cleaning system will consist of two sieves, an upper or coarser sieve or chaffer located below the threshing mechanism or separator of the combine and having larger sieve openings for the passage of grain and smaller elements of plant material therethrough but relatively little of the larger chaff, and a lower finer sieve located below the chaffer for receiving the grain and smaller elements of plant material therefrom and having smaller sieve openings for passage of the grain therethrough but relatively little of the plant material. The collected and cleaned grain, once through the sieves is then typically transported by conveyor or other means to a clean grain tank or bin on the combine, or to an accompanying grain receiving vehicle.

A typical sieve construction includes a plurality of elongate parallel, pivotally mounted slats, each slat including a plurality of longitudinally spaced upwardly extending inclined fingers, the slats being pivotable through a range of open positions angularly oriented to horizontal for providing a corresponding range of openings or spaces between the fingers of adjacent ones of the slats. A sieve may be adjusted to a desired opening at the commencement of the harvesting operation, and may be reset at times during the harvesting operation, either mechanically or automatically, to achieve a desired crop yield rate. It may also be necessary to access the sieve, during or after the harvesting operation, to clear any chaff, plant material, debris, or the like that may become lodged in the spaces or openings in the sieve.

It may also be necessary to remove the sieve for cleaning, service, replacement, and the like. Generally the sieves are mounted and retained in the combine using hardware, such as nuts and bolts accessed from the side of the combine. Accordingly, this mounting arrangement requires opening a side panel on the combine, locating the retaining hardware on the inside of the sieve support structure, which may or may not be visible or readily accessible from the outside of the combine, and removing the retaining hardware. Then the procedure is repeated on the opposite side of the combine. Once the retaining hardware is removed from both sides of the combine, the sieve may be removed from the rear of the combine by lifting the sieve from its support structure and then pulling it from the rear of the combine. The procedure must be reversed to mount and retain the sieve when replaced. Since the retaining hardware (nuts and bolts) is removed from the support structure prior to removing the sieve, these small pieces of hardware can easily be dropped and/or lost during subsequent cleaning or service of the sieve resulting in delay and additional down time for the combine. Also, in some instances, the upper sieve, or chaffer, must be removed whether or not it needs maintenance, just to gain access to the lower sieve. Finally, removal and/or replacement of the sieve by lifting and/or lowering the sieve relative to its support structure can be difficult and undesirable.

As a result, what is sought is a sieve retainer which is more accessible, preferably solely from the rear of the combine, and which provides improved and easier access to, and removal and replacement of the sieve without significant lifting.

SUMMARY OF THE INVENTION

According to the present invention, a sieve retainer which is more accessible, particularly from the rear of a combine, and which provides improved access to, and removal and replacement of the sieve, which provides one or more of the features and advantages sought above, and overcomes many of the problems and shortcomings identified above, is disclosed.

According to a preferred aspect of the invention, an elongate sieve support structure is supported on the combine for reciprocating movement longitudinally in the first and second directions. The sieve support structure includes side retainers extending longitudinally in the first and second directions and cooperatively engages first and second side edges of a sieve, respectively, supporting the sieve along the first and second side edges for the reciprocating movement in the first and second directions with the support structure. An end retainer structure is disposed adjacent to a second end peripheral edge of the sieve. It is configurable in at least one locking mode in cooperative engagement with the second end peripheral edge of the sieve for retaining and limiting movement of the sieve relative to the sieve support structure, and is releasable in at least one unlocking mode for allowing movement of the sieve in the second direction longitudinally relative to the sieve support structure and the side retainers for allowing removal of the sieve in the first direction longitudinally relative to the sieve support structure and the side retainers.

According to another aspect of the invention, the end retainer structure has elongate members attached to the sieve support structure disposed adjacent to the second end of the sieve, receiving members movable in the first and second directions relative to the elongate members, an elongate element connecting the receiving members and abuttingly engageable with the second end peripheral edge of the sieve, and detent elements retained on and positionable longitudinally along the elongate members. When the end retainer is configured in a locking mode, the elongate members extend through the receiving members and the detent elements are locked against the receiving members causing the elongate element to be fixedly held thereby against the sieve. When the end retainer is configured in the unlocking mode, the elongate element is separated from the sieve to allow movement of the sieve longitudinally relative to the sieve support structure, and the detent elements remain on the elongate members.

According to preferred embodiment of the invention, the detent element has a first transverse extent larger than a transverse extent in a predetermined direction of the receiving member. The detent element can be oriented so that the first extent extends in the predetermined direction of the receiving element to prevent the movement of the sieve longitudinally relative to the sieve support structure. The detent element also has a second transverse extent smaller than the transverse extent in the predetermined direction of the receiving member. The detent element can be oriented so that the second extent extends in the predetermined direction of the receiving element to allow the movement of the sieve longitudinally relative to the sieve support structure. The detent element also includes a locking element configured for fixedly holding the detent element at a position along the elongate member. The detent element may also include a tab configured for cooperative engagement with a notch in the receiving member when the detent element is fixedly locked against the receiving member.

In a preferred embodiment of the invention the end retainer comprises a rake of the combine. Accordingly, removal of the rake, allows access to the sieve. It is also likely that removal of the rake will allow access to, or removal of, one sieve without necessitating removing the other sieve. The invention may be utilized for the upper sieve, the lower sieve, or both.

As a result, the sieve retainer, with its associated hardware, is more accessible, particularly from the rear of the combine. The invention provides improved access to, and removal and replacement of the sieve, and decreases the likelihood that sieve retaining hardware will be dropped or lost.

DETAILED DESCRIPTION OF THE INVENTION

Figure 1:
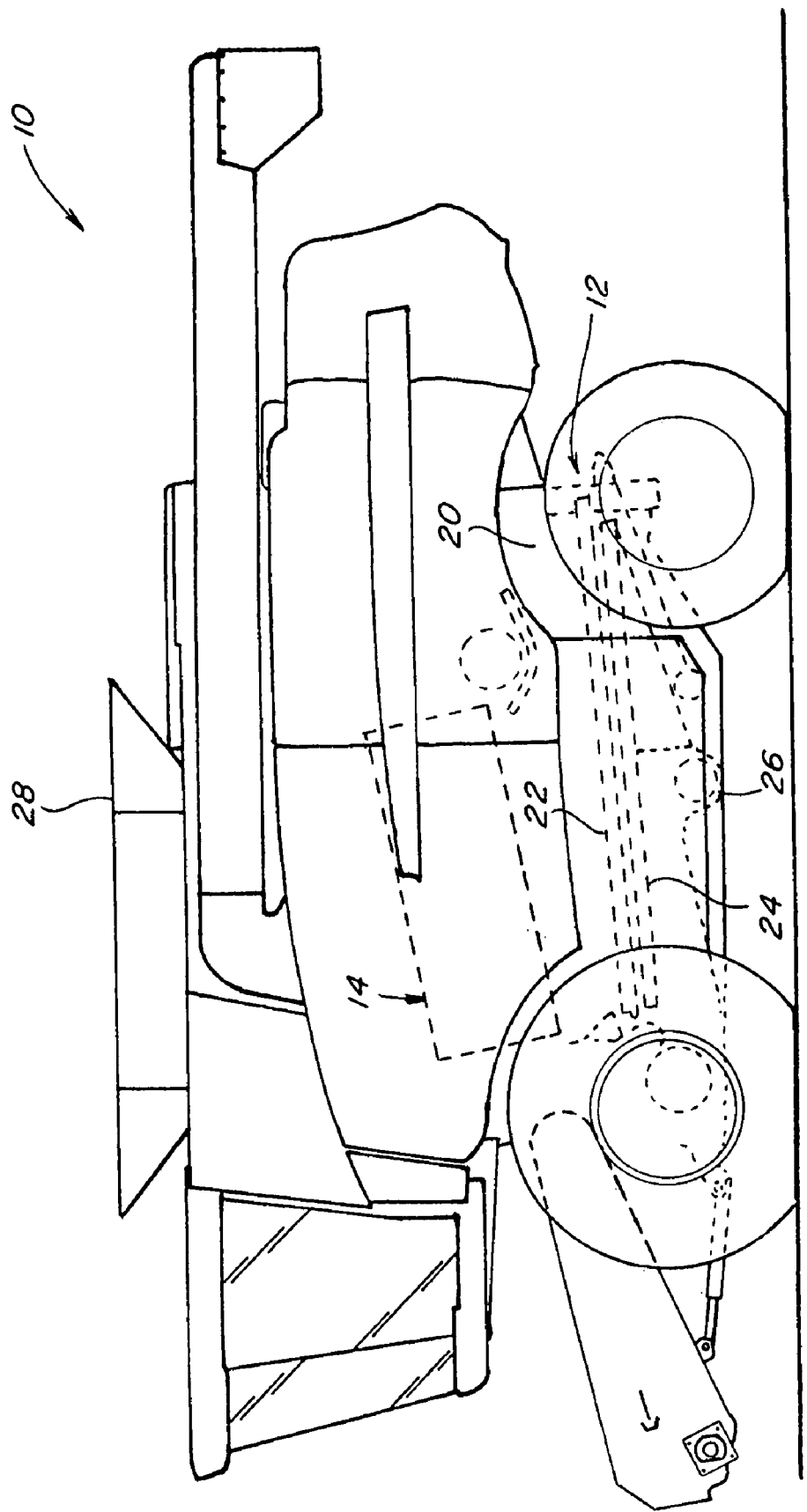
FIG. 1 is a simplified side view of an agricultural combine including a rear accessible sieve retainer according to the present invention.

Referring now to the drawings, in FIG. 1 a conventional agricultural combine 10 is shown, illustrating generally the location of a sieve retainer 12 in connection therewith and constructed and operable according to the teachings of the present invention. Agricultural combine 10 generally includes a threshing mechanism or separator 14 operable for receiving crop material from a harvesting mechanism (not shown) on a front end of combine 10, separator 14 being operable for separating smaller grains, seeds, pods and related plant material from larger stalks, stems, leaves, husks and other elements of the crop material, as well as vines, weeds and the like which may be present in the harvested crop material. The smaller material falls from separator 14 into one or more augers (not shown) disposed below separator 14, which collect the smaller material and convey it to a cleaning system 20.

Cleaning system 20 includes an upper, coarser sieve, also known as a chaffer 22, positioned for receiving the material from the auger, augers or threshing mechanism, and a lower, finer sieve 24 which receives grain or seeds which pass through chaffer 22. Sieves 22, 24, in turn, separate or clean the grain or seed from the remaining other material, such as pod fragments and the like, for collection by a lower auger 26 which conveys the clean grain or seeds to an elevator, which conveys the clean grain or seeds upwardly to a clean grain bin 28. Chaffer 22 and sieve 24 are vibrated or reciprocated during operation by suitable means (not shown) for facilitating sifting of the crop material therethrough. Material which does not pass through is moved rearwardly on chaffer 22 or sieve 24 by the vibration or reciprocal action and is either blown or drops from the rear end thereof through an opening in the rear of combine 10 or into a return auger to be carried back to separator 14 or chaffer 22.

Figure 2:
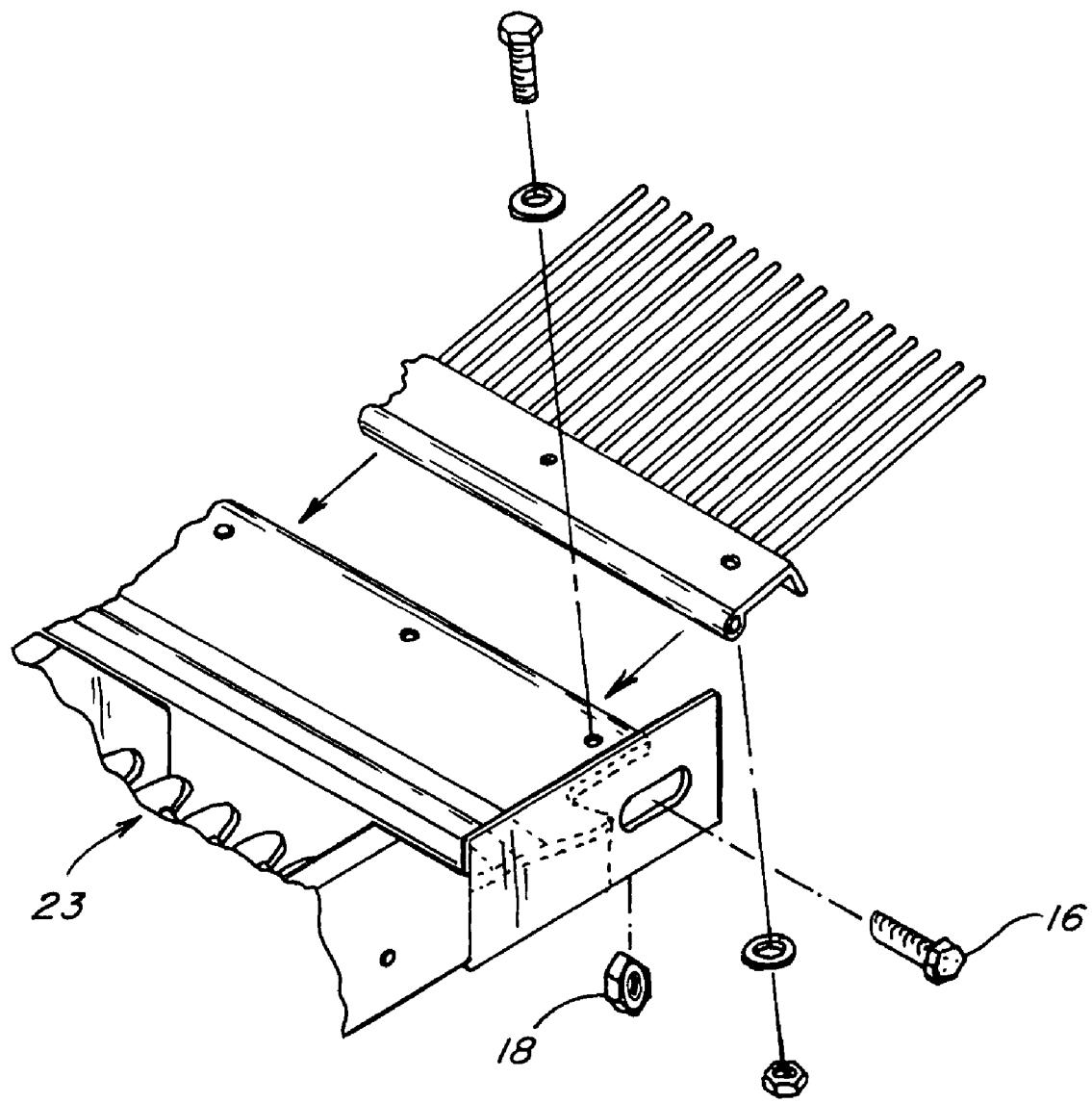
FIG. 2 is an example of a simplified, exploded view of a prior art sieve and rake attachment area of an agricultural combine.

Often, chaffer 22 and sieve 24 are mounted and retained in combine 10 with hardware, such as bolts 16 and nuts 18, as shown by a representative prior art chaffer 23 of FIG. 2. Retaining hardware 16, 18, which is most often inserted from the side of combine 10, must be located and removed from behind side panels on both sides of combine 10 prior to removing chaffer 23 from the rear of combine 10. Typically chaffer 23 is lifted from its support structure (not shown), and then pulled rearwardly from combine 10. Mounting and retaining chaffer 23 requires reversing the procedure, positioning chaffer 23 from the rear of combine 10, pushing it into position, and lowering it on its support structure. Then retaining hardware 16, 18 is reinstalled on each side of combine 10, provided bolts 16 and nuts 18 have not been lost while chaffer 23 is disassembled or removed. Also, chaffer 23 usually must be removed before gaining access to a lower sieve, which is also mounted from the sides of the combine.

Figure 3:
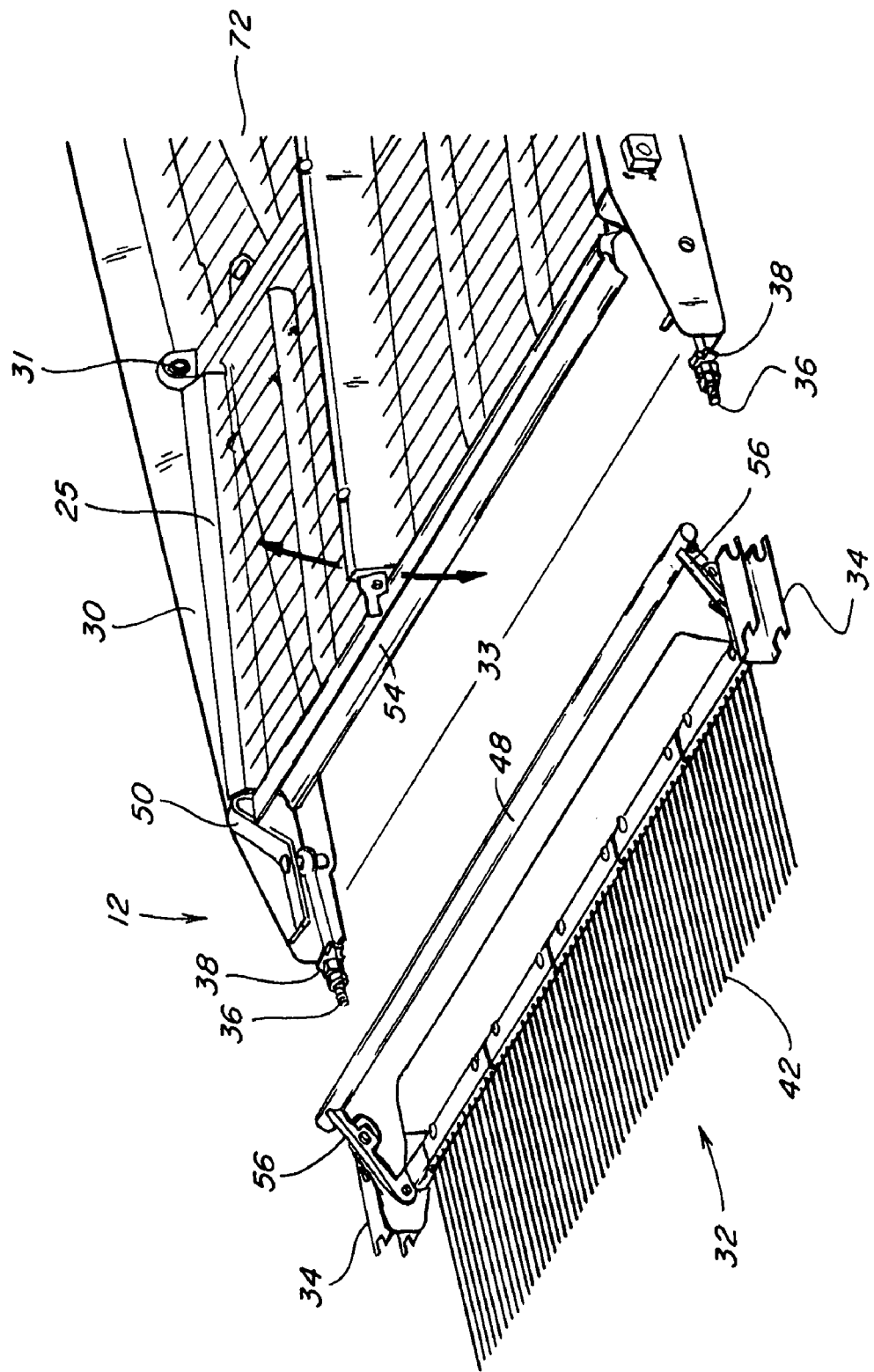
FIG. 3 is a simplified perspective view of a sieve retainer of the present invention.

A sieve retainer 12 according to the present invention is generally shown in FIG. 3. For ease of reference, the invention will be described as utilized with a chaffer, or upper sieve, 22. It should be understood that the invention may also be utilized to retain the lower sieve 24 in a similar manner. It should also be understood that when only one side of sieve retainer 12 is shown, the opposite side operates in a similar manner to the side illustrated. As shown in FIG. 3, sieve 22 is supported in combine 10 by an elongate sieve support structure 30 defining a longitudinally extending elongate cavity, and includes parallel opposite side retainers 31 for supporting side edges 25 of sieve 22. Sieve support structure 30, along with sieve 22 are vibrated or reciprocated in a generally forward and rearward manner during a harvesting operation. Sieve retainer 12 is an end retainer structure that can be described to include a removable end portion 32 and an attached retaining portion 33. Attached retaining portion 33 includes elongate members 36 extending rearwardly from the elongate sieve support structure 30, and guide 50 disposed near elongate members 36. Also, detent elements 38 are mounted and retained on elongate members 36. Removable end portion 32 includes receiving members 34 attached to slanted support members 56 which are connected by an elongate element 48. When utilized to retain chaffer 22, removable end portion 32 may comprise a rake 42, but in general, a rake would not be required for use with lower sieve 24.

Figure 4:
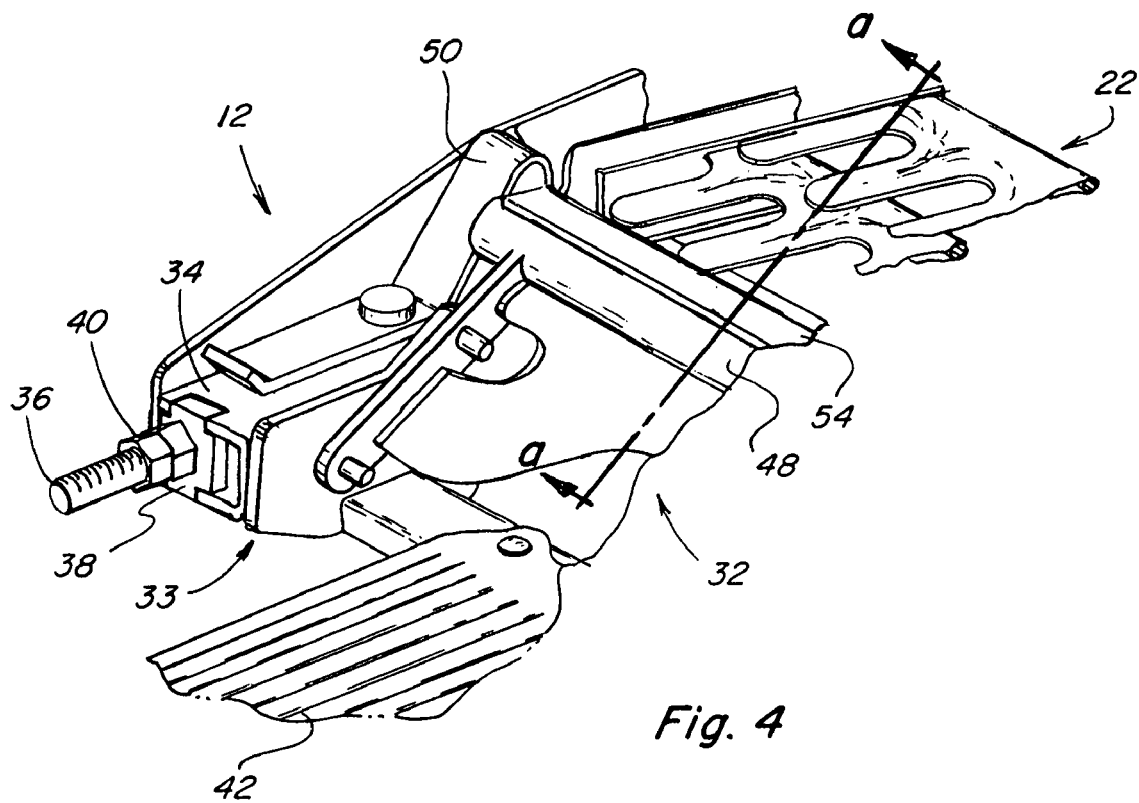
FIG. 4 is a simplified perspective view of the sieve retainer showing one side of the retainer in a locking configuration according to the present invention.

FIG. 4 shows one side of sieve retainer 12 in a locking configuration so as to retain sieve 22 as it may be used in a harvesting operation. Removable end portion 32 is engaged with attached retaining portion 33 at the rear of combine 10. Elongate element 48 abuts a rear peripheral edge 54 of sieve 22 (see FIG. 3 also) and engages guide 50, with elongate member 36 extending through receiving member 34. Detent 38 is positioned and oriented to abut and block rearward movement of receiving member 34 and locked in place by elements 40. By way of example, elongate member 36 may be threaded, like an eye bolt or the like, and detent 38 may be locked in place by nuts threadedly engaged with the bolt. Other suitable retaining structure may alternatively be used.

Figure 5:
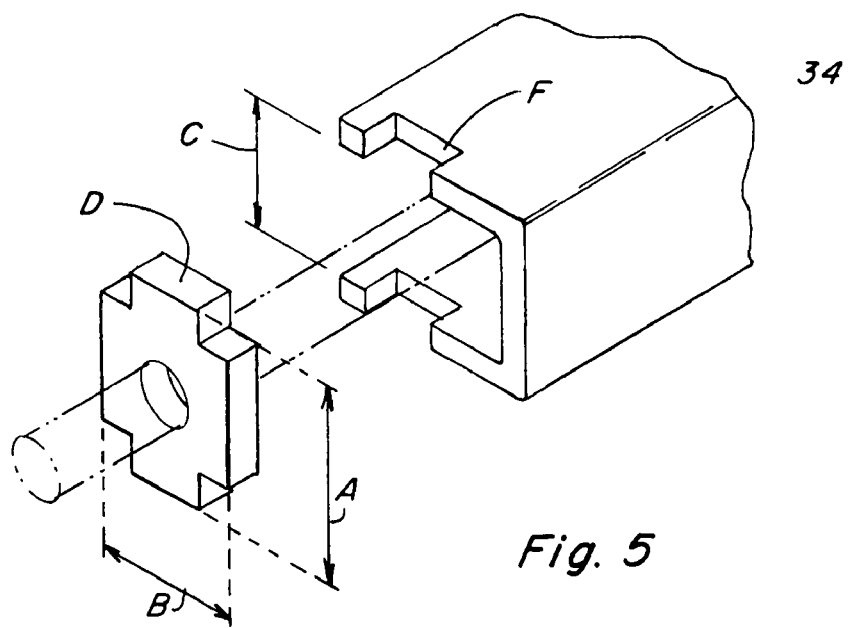
FIG. 5 is an exploded view of a receiving member and a portion of the detent element according to the present invention.

FIG. 5 depicts a preferred embodiment of detent 38 and receiving member 34 according to the invention. Detent 38 includes a transverse extent A which is larger than a predetermined extent C of receiving member 34, and a transverse extent B which is smaller than predetermined extent C of receiving member 34. Detent 38 may also include a tab D configured to engage a notch F of receiving member 34. When sieve retainer 12 is in the locking position, detent 38 engages receiving member 34 with larger extent A extending in the direction of extent C, and tab D engages notch F preventing rearward movement of receiving member 34, and thus preventing rearward movement of sieve 22.

Figure 6:
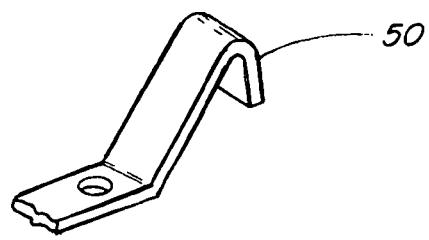
FIG. 6 is an enlarged perspective view of a portion of the rear sieve retainer attached to the sieve support structure.
Figure 7:
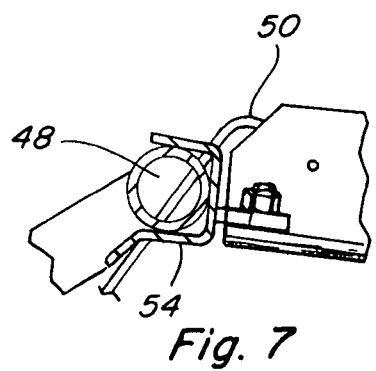
FIG. 7 is a cross section view taken at line a-a of FIG. 4 according to the present invention.
Figure 8:
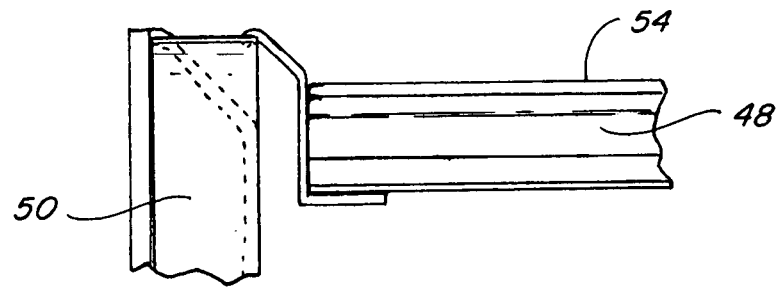
FIG. 8 is a rear view of a portion of the sieve retainer structure as shown in FIG. 4.
Figure 9:
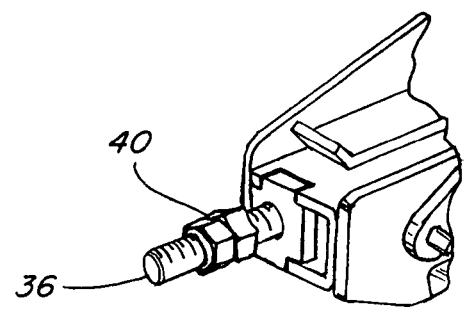
FIG. 9 is a simplified perspective view of the sieve retainer at an intermediate point between the locking configuration and an unlocking configuration according to the present invention.

FIGS. 6-8 provide some detail of the locking structure at the rear of sieve 22. FIG. 6 is an enlarged view of guide 50 which is near rear peripheral edge 54. When retainer 12 is in the locked position (FIG. 4), elongate element 48 is in abutting relation with rear peripheral edge 54 of sieve 22. FIG. 7 is a side view taken at line a-a of FIG. 4, showing elongate element 48 seated against rear peripheral edge 54 of sieve 22. Finally, FIG. 8 is a partial rear view of the structure showing the relationship between guide 50 and rear peripheral edge 54 of sieve 22. Holding elongate element 48 against sieve 22 with such a structure allows for secure retention of sieve 22 during harvesting and easier removal for sieve replacement or maintenance.

Figure 10:
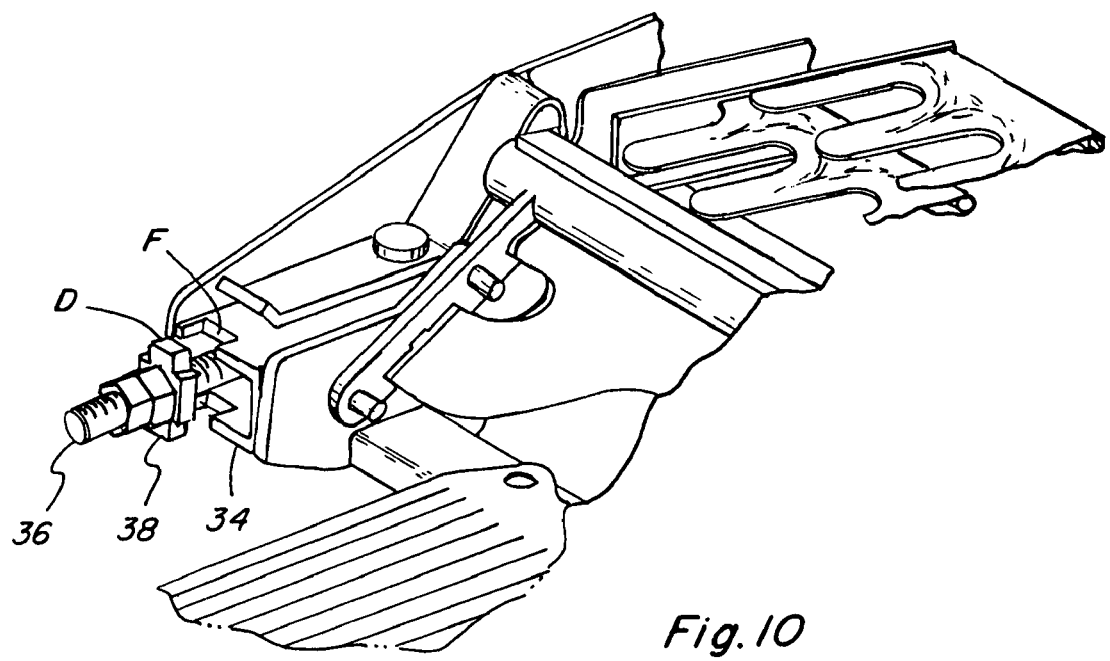
FIG. 10 is a simplified perspective view of the sieve retainer showing one side of the retainer at another intermediate point between the locking configuration and the unlocking configuration according to the present invention.
Figure 11:
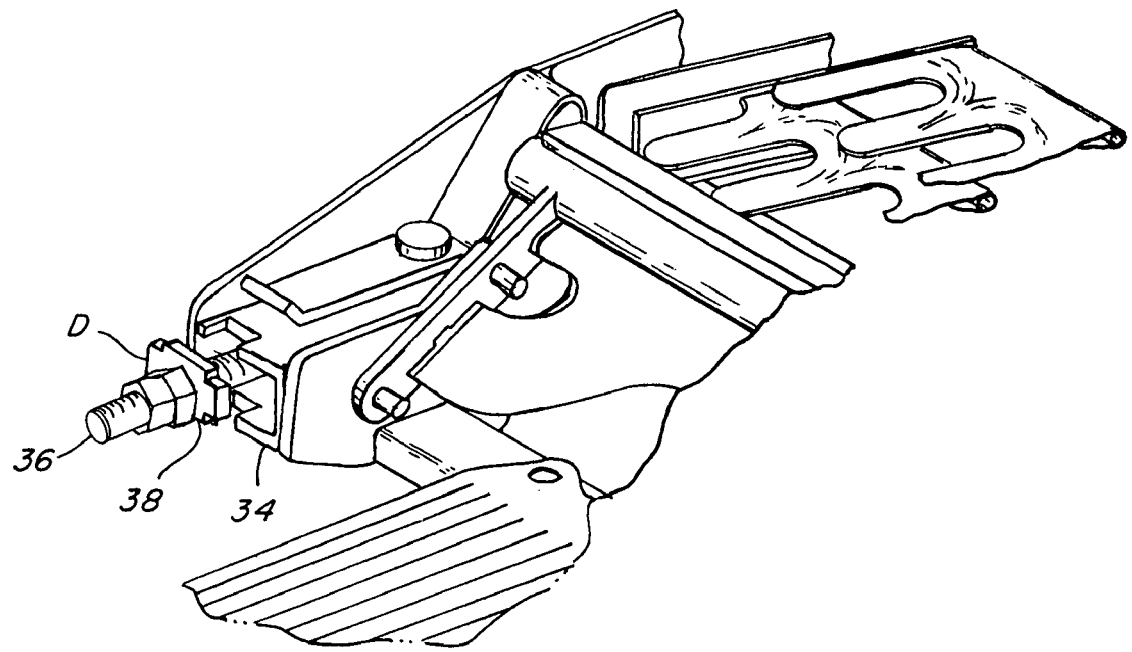
FIG. 11 is a simplified perspective view of the sieve retainer at yet another intermediate point between the locking configuration and the unlocking configuration according to the present invention.
Figure 12:
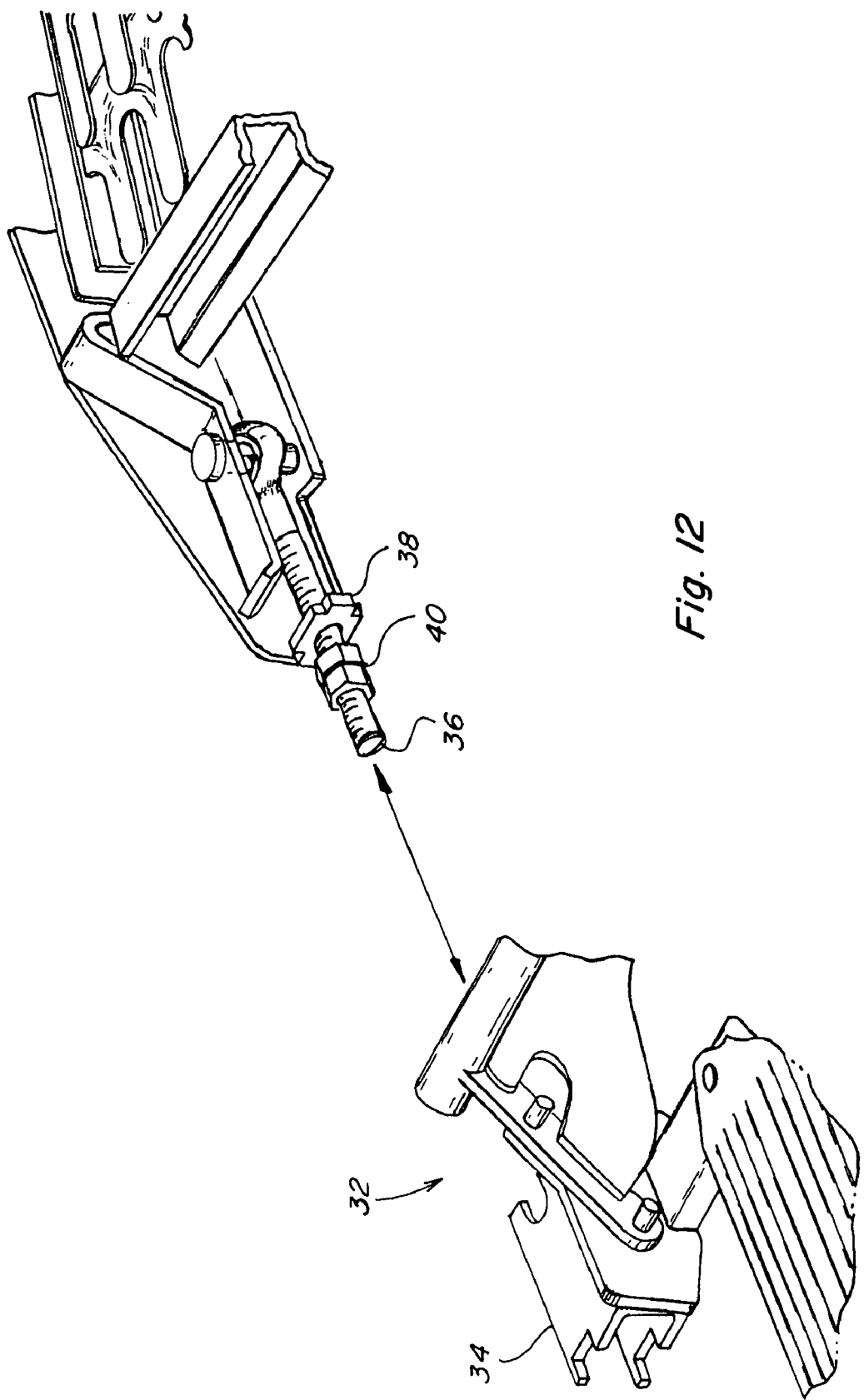
FIG. 12 is a simplified perspective view of the sieve retainer showing one side of the retainer in the unlocking configuration according to the present invention.

Retainer 12 may be placed in an unlocking configuration to remove sieve 22 from combine 10 as shown in FIGS. 9-12 with reference to FIG. 5. Locking elements 40 are loosened and moved rearwardly along elongate member 36 (FIG. 9), and detent 38 is moved rearwardly away from receiving member 34 by disengaging tab D from notch F (FIG. 10). Detent 38 is oriented to extend smaller transverse extent B in the direction of extent C (FIGS. 5 and 11), allowing receiving member 34 to move longitudinally relative to elongate member 36 unimpeded by detent 38. Thus removable end portion 32 may be removed from the rear of combine 10 (FIG. 12), and sieve 22 may be moved longitudinally with respect to support structure 30 and removed from the rear of combine 10. As an apparent advantage here, no small pieces of hardware need be removed from combine 10 for removal of sieve 22. In this regard, detent 38 and locking elements 40 remain mounted on elongate member 36, even when sieve 22 is removed. Although, any or all of these elements could be removed if desired.

Sieve 22, once repaired or replaced, can be mounted on combine 10 and retained by sieve retainer 12. Sieve 22 is slid into support structure 30 in position for a harvesting operation. Retaining sieve 22 is described with reference to FIGS. 3-12. In a preferred embodiment of the invention, sieve 22 may be pivoted around a line defined between side retainers 31 as indicated by the arrows shown in FIG. 3. When removable end portion 32 is removed from attached end portion 33, sieve 22 may pivot downward from its position shown in FIG. 3, thus flattening sieve 22 for longitudinal removal. Engaging removable end portion 32 with attached retaining portion 33 may require pivoting sieve 22 up from its flattened position to abut elongate element 48 against rear peripheral edge 54 of sieve 22. Elongate members 36 extend through receiving members 36 and detents 38 are moved and locked in place against receiving members 36. More specifically, detents 38, are positioned to extend transverse extents B in the direction of extents C of receiving members 34 to prevent rearward movement of receiving members 34. Accordingly, sieve 22 will be prevented from longitudingal movement relative to support structure 30.

Figure 13:
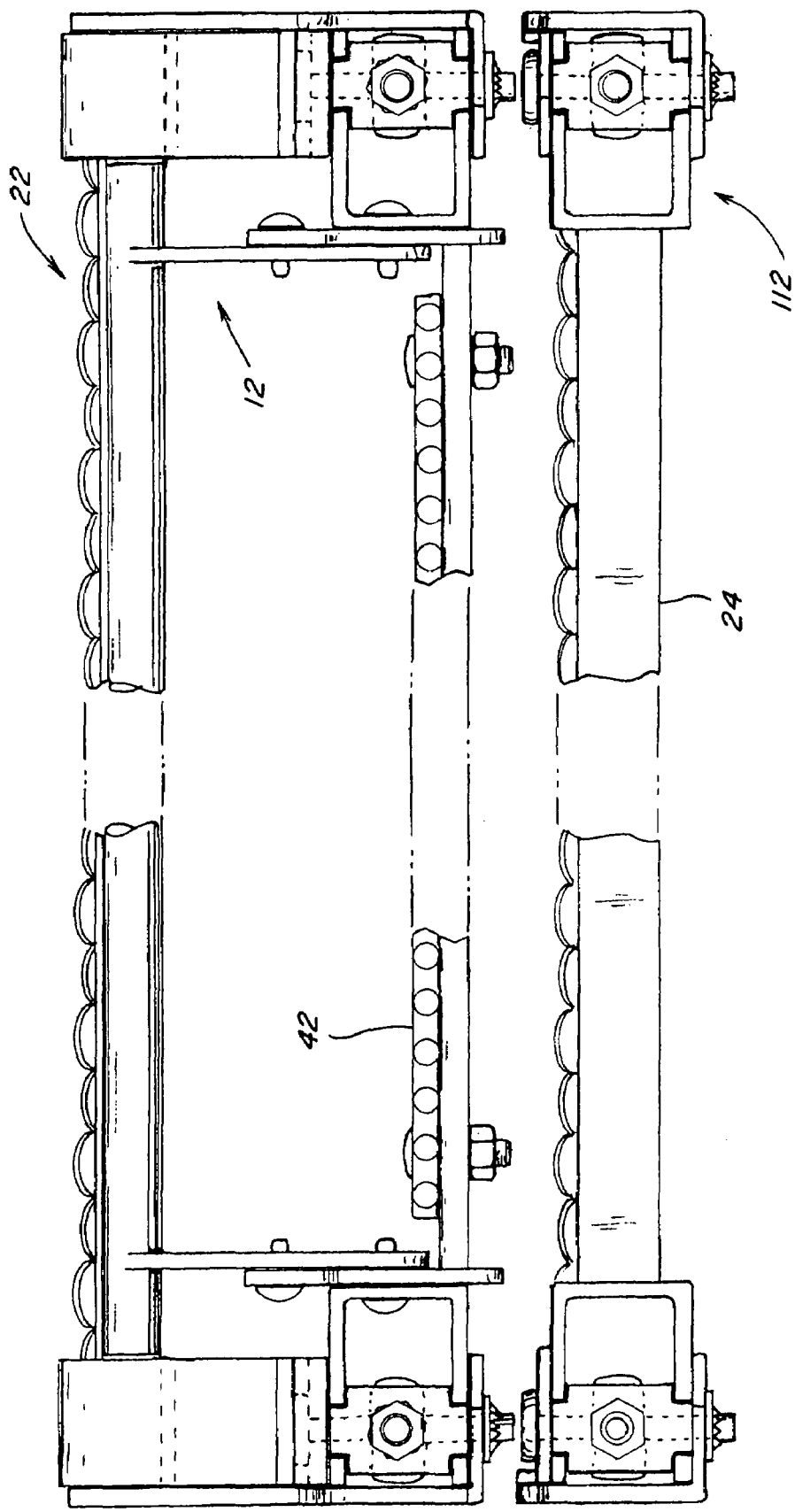
FIG. 13 is a simplified rear view of the combine showing both upper and lower sieves retained using the rear accessible sieve retainer according to the present invention.
Figure 14:
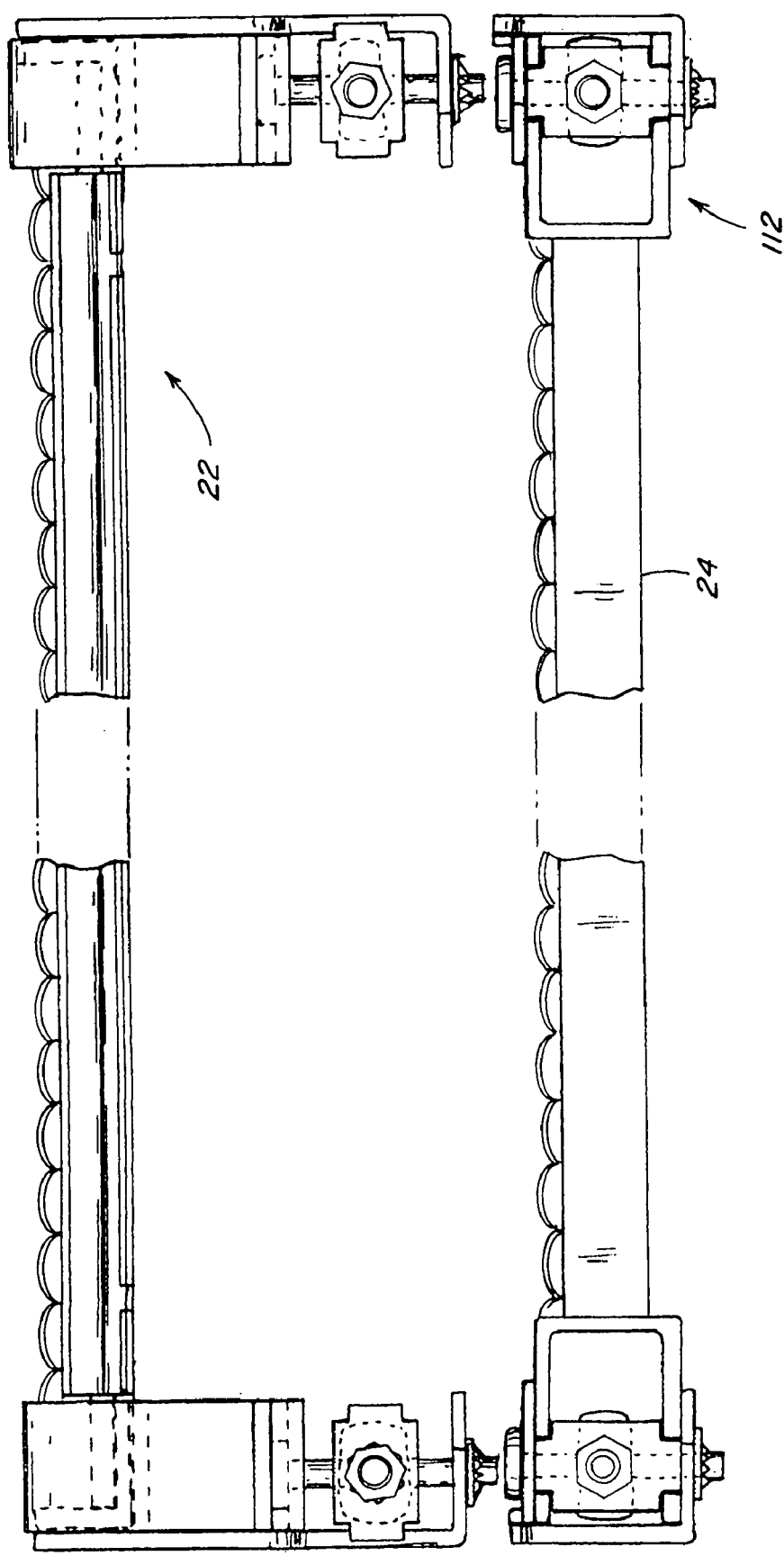
FIG. 14 is a simplified rear view of the combine showing the sieve retainer removed from the upper sieve and the lower sieve retained using the rear accessible sieve retainer according to the present invention.
Figure 15:
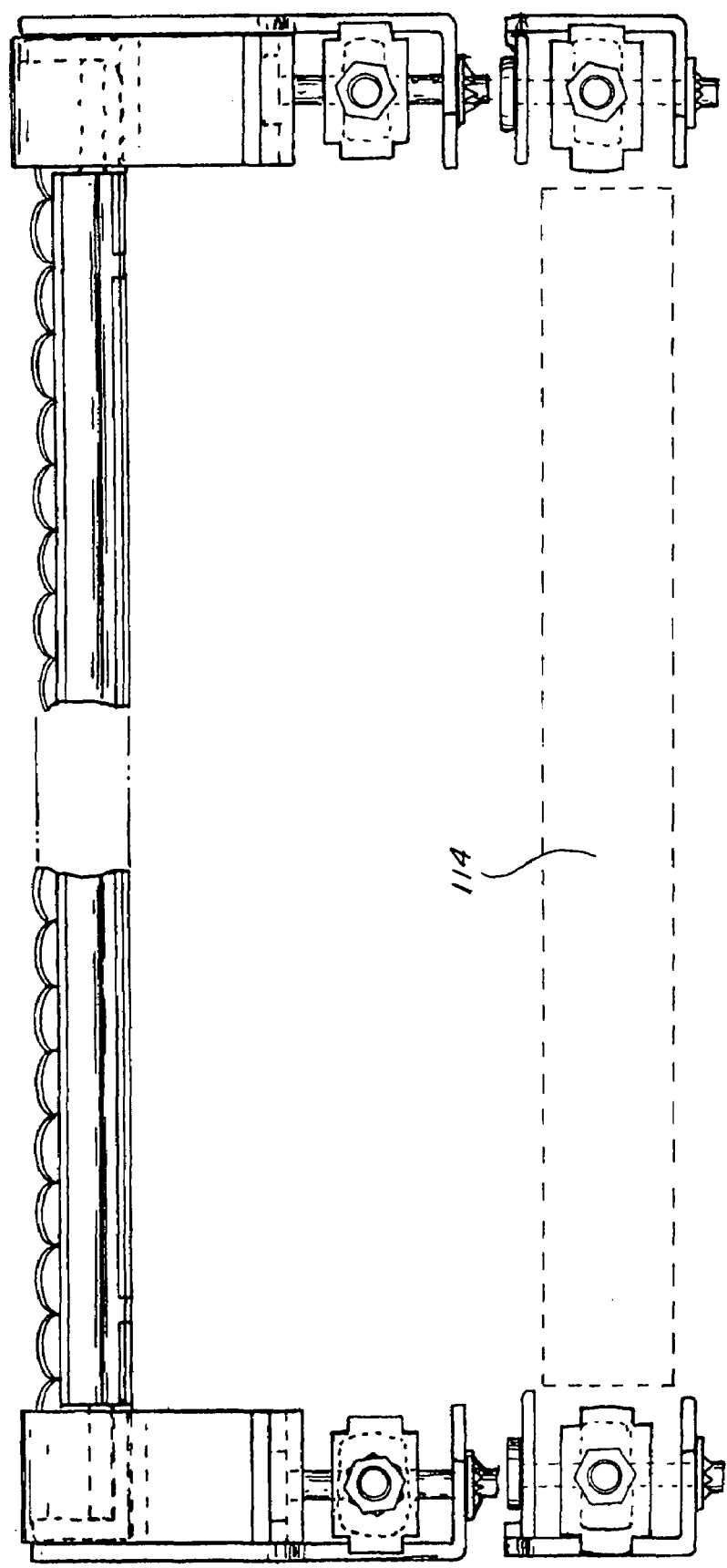
FIG. 15 is a simplified rear view of the combine with the lower sieve removed without removing the upper sieve.

As previously stated, the present invention can be utilized with either chaffer or upper sieve 22 or lower sieve 24. FIG. 13 is a simplified rear view of combine 10 with retainer 12 as described hereinabove, and including rake 42 as used with upper sieve 22, and retainer 112 as used with lower sieve 24. Retainers 12 and 112 are shown in their locking configurations in FIG. 13. FIGS. 14 and 15 depict another advantage of the present invention. FIG. 14 shows retainer 12 with removable end portion 32 removed allowing access to lower sieve 24 without the necessity of removing upper sieve 22. FIG. 15 illustrates that lower sieve 24 may be removed through aperture 114 partially defined by opposite side retainers (not shown) from the rear of combine 10 without removing upper sieve 22.

It is also important to note that retainer 12 provides an additional measure of safety for operators. According to the present invention, sieves 22, 24 may be removed from support structure 30 of combine 10 by one longitudinal sliding movement. Presently removal requires both a lifting movement to remove sieve 22, 24 from support structure 30, and then sliding movement to remove sieve 22, 24 from combine 10.

It will be understood that changes in the details, materials, steps, and arrangements of parts which have been described and illustrated to explain the nature of the invention will occur to and may be made by those skilled in the art upon a reading of this disclosure within the principles and scope of the invention. Further, terms such as right/left, forward/rearward, and the like, are used for reference only. The foregoing description illustrates the preferred embodiments of the invention; however, concepts, as based upon the description, may be employed in other embodiments without departing from the scope of the invention. Accordingly, the following claims are intended to protect the invention broadly as well as in the specific form shown.

What is claimed is:

1. An apparatus for retaining a sieve in an agricultural combine, the sieve having first and second side edges and a first end peripheral edge facing in a first direction within the combine and a second end peripheral edge facing in a second direction opposite the first direction, comprising:

an elongate sieve support structure supported on the combine for reciprocating movement longitudinally in the first and second directions, the sieve support structure including side retainers extending longitudinally in the first and second directions and cooperatively engaged with the first and second side edges of the sieve, respectively, supporting the sieve along the first and second side edges for the reciprocating movement in the first and second directions with the support structure;

an end retainer structure disposed adjacent to the second end peripheral edge of the sieve and configurable in at least one locking mode in cooperative engagement with the second end peripheral edge of the sieve for retaining and limiting movement of the sieve relative to the sieve support structure, and releasable in at least one unlocking mode for allowing movement of the sieve in the second direction longitudinally relative to the sieve support structure and the side retainers for allowing removal of the sieve in the first direction longitudinally relative to the sieve support structure and the side retainers; and wherein the end retainer structure includes:

elongate members attached to the sieve support structure disposed adjacent to the second end of the sieve;

receiving members movable in the first and second directions relative to the elongate members;

at least one elongate element in connection with the receiving members and abuttingly engageable with the second end peripheral edge of the sieve;

detent elements retained on and positionable longitudinally along the elongate members;

wherein when the end retainer is configured in the at least one locking mode with the elongate members extending through the receiving members and the detent elements locked against the receiving members, the elongate element will be fixedly held thereby against the sieve; and when the end retainer is released in the at least one unlocking mode with the elongate element separated from the sieve to allow movement of the sieve longitudinally relative to the sieve support structure, the detent elements remain on the elongate members.

2. The apparatus of claim 1, wherein the side retainers bound a longitudinally extending elongate cavity extending in the first and second directions, and wherein the releasing of the end retainer in the unlocking mode allows the movement of the sieve in the second and first directions longitudinally for the removal of the sieve.

3. The apparatus of claim 1, wherein the detent element comprises:

a first transverse extent larger than a transverse extent in a predetermined direction of the receiving member, and wherein the detent element can be oriented so as to extend the first extent in the predetermined direction of the receiving element to prevent the movement of the sieve longitudinally relative to the sieve support structure;

a second transverse extent smaller than the transverse extent in the predetermined direction of the receiving member, and wherein the detent element can be oriented so as to extend the second extent in the predetermined direction of the receiving element to allow the movement of the sieve longitudinally relative to the sieve support structure; and a locking element configured for fixedly holding the detent element at a position along the elongate member.

4. The apparatus of claim 3, wherein the detent element includes a tab configured for cooperative engagement with a notch in the receiving member when the detent element is fixedly locked against the receiving member.

5. The apparatus of claim 1, wherein the elongate member is threaded, and the detent element includes at least one nut threadably engageable therewith.

6. The apparatus of claim 1, wherein the end retainer structure comprises a rake of the combine.

7. The apparatus of claim 1, additionally comprising:

a second sieve support structure supported in the combine for reciprocating movement longitudinally in the first and second directions, the second side support structure including side retainers extending in the first and second directions and cooperatively engaged with first and second side edges of a second sieve, respectively, supporting the second sieve along the first and second side edges for the reciprocating movement in the first and second direction with the second support structure; and a second end retainer structure disposed adjacent to a second end peripheral edge of the second sieve and configurable in at least one locking mode in cooperative engagement with the second end peripheral edge of the sieve for retaining and limiting movement of the second sieve relative to the second sieve support structure, and releasable in at least one unlocking mode for allowing movement of the second sieve in the second direction longitudinally relative to the second sieve support structure and the side retainers for allowing removal of the second sieve in the first direction longitudinally relative to the second sieve support structure and the side retainers; and wherein the second sieve is located below the first sieve thereby defining a vertical space therebetween within the combine, and the longitudinal movement of the second sieve maintains the vertical space thereby allowing the longitudinal movement of the second sieve without prior removal of the first sieve.

8. A retainer apparatus for a sieve support structure supported for reciprocating movement in a first direction and an opposite second direction within a cavity of an agricultural combine, comprising:

an attached retainer portion disposed in connection with the sieve support structure adjacent to a first end thereof;

a removable retainer portion which, when configured:

in a locking mode is lockingly engageable with the attached retainer portion for fixedly retaining a sieve in connection with the sieve support structure;

in an unlocking mode is removable from the attached retainer portion for releasing the sieve to allow movement of the sieve in the first and second directions relative to the support structure;

wherein the attached retainer portion further includes elongate members in connection with the first end of the sieve support structure and lockable detent elements movably mounted and retained on the elongate members;

the removable retainer portion includes an elongate element abuttingly engageable with a first peripheral edge of the sieve, and receiving members attached to the elongate element and movable in the first and second directions in relation to the elongate members of the attached retainer portion; wherein when configured in the locking mode with the receiving members positioned adjacent to the sieve support structure with the elongate members extending therethrough and locked thereat by the detent elements, the elongate element is abuttingly engaged with the first peripheral edge of the sieve; and when configured in the unlockingly mode, the removable retainer portion is separated from the attached retainer portion thereby creating an opening to allow the movement of the sieve longitudinally in the first and second directions relative to the sieve support structure to allow removal or replacement of the sieve.

9. The retainer of claim 8, wherein the sieve support structure defines a longitudinally extending elongate cavity extending in the first and second directions, and wherein releasing the removable retainer portion in the unlocking mode allows the movement of the sieve in the first and second directions longitudinally for removal and replacement of the sieve, respectively.

10. The retainer of claim 8, wherein the detent element comprises a first extent larger than an extent in a predetermined direction of the receiving member, and wherein the detent element is configured to be positionable with the first extent oriented with the extent of the receiving member so as to prevent longitudinal movement of the receiving member, and a second extent smaller than a the extent in the predetermined direction of the receiving member, and wherein the detent element is configured to be positionable with the second extent oriented with the extent of the receiving member to allow removal of the removable retainer portion.

11. The retainer of claim 10, wherein the detent elements include tabs sized and shaped for engagement with notches in the receiving elements, respectively.

12. The retainer of claim 8, wherein the elongate members are threaded and the detent elements include at least one nut threadedly engageable therewith.

13. The retainer of claim 8, wherein the removable retaining portion comprises a rake of the combine.

14. An apparatus for a securing a sieve in an agricultural combine, comprising:
a first side retainer and a generally parallel opposite second side retainer supported on a combine for reciprocating forward and rearward movement thereon and defining an aperture for accepting a sieve through a rear and open end of the combine;
a retaining element cooperatively engageable with the side retainers disposed adjacent to the rear end of the combine, the retaining element configurable in a locking mode for preventing the rearward movement of the sieve through the aperture, and the retaining element configurable in an unlocking mode for allowing the rearward or forward movement of the sieve through the aperture for removal or replacement of the sieve, respectively;
wherein the retaining element further includes an elongate element fixedly engageable adjacent to the rear end of the sieve, the elongate element having receiving members attached adjacent to opposite ends thereof, the receiving members slidably movable relative to elongate members attached adjacent to the rear of the combine, and lockably orientable detent elements movably mounted and retained on the elongate members; wherein:
when the retaining element is configured in the locking mode, the elongate element is fixedly held adjacent to the rear end of the sieve, when the receiving members are positioned adjacent to the rear end of the combine with the elongate members extending therethrough and the detent elements are moved and oriented to prevent the rearward movement of the sieve through the aperture; and
when the retaining element is configured in the unlocking mode, the elongate element is disengaged from the rear end of the sieve, when the receiving members are separated from the rear end of the combine, and the detent elements remain on the elongate members.

15. The mechanism of claim 14, wherein the detent element has a first dimension larger than an extent of a predetermined direction of the receiving member, and the wherein detent element is positionable with the first dimension so as to prevent the rearward movement of the receiving element when the retaining element is configured in the locking mode, and a second dimension smaller than the extent in the predetermined direction of the receiving member, and wherein the detent element is positionable with the second element so as to allow the rearward movement of the receiving element when the retaining element is configured in the unlocking mode.

16. The mechanism of claim 14, wherein the elongate members are threaded and the locking elements include at least one nut threadedly engageable therewith.

17. The mechanism of claim 15, wherein the detent element includes a tab configured to be engageable with a notch in the receiving member.

18. The mechanism of claim 14, wherein the retaining element comprises a rake of the combine.

* * * * *